United States Patent
Aho et al.

(10) Patent No.: US 6,598,116 B1
(45) Date of Patent: Jul. 22, 2003

(54) MEMORY INTERFACE USING ONLY ONE ADDRESS STROBE LINE

(75) Inventors: Ari Aho, Tampere (FI); Markku Lipponen, Tampere (FI); Jarno Knuutila, Tampere (FI)

(73) Assignee: Nokia Mobile Phones Limited, Espoo (FI)

( * ) Notice: Subject to any disclaimer, the term of this patent is extended or adjusted under 35 U.S.C. 154(b) by 0 days.

(21) Appl. No.: 09/430,899

(22) Filed: Nov. 1, 1999

(30) Foreign Application Priority Data

Nov. 2, 1998 (FI) .................................................. 982374

(51) Int. Cl.[7] .............................................. G06F 12/02
(52) U.S. Cl. .................. 711/105; 711/167; 365/189.04; 365/189.05; 365/193; 365/230.02
(58) Field of Search ................................ 711/105, 167; 365/189.05, 189.01, 193, 230.02

(56) References Cited

U.S. PATENT DOCUMENTS

| | | | | |
|---|---|---|---|---|
| 5,179,687 A | * | 1/1993 | Hidaka et al. .............. | 365/193 |
| 5,226,139 A | * | 7/1993 | Fujishima et al. ...... | 365/189.05 |
| 5,511,024 A | * | 4/1996 | Ware et al. ............ | 365/189.01 |
| 5,600,606 A | * | 2/1997 | Rao ....................... | 365/189.05 |
| 5,634,105 A | * | 5/1997 | Mizuno ................. | 365/230.02 |
| 6,215,497 B1 | * | 4/2001 | Leung ........................ | 345/419 |
| 6,327,192 B1 | * | 12/2001 | Lee ........................ | 365/189.05 |

FOREIGN PATENT DOCUMENTS

DE          2948159 A1         6/1981

OTHER PUBLICATIONS

"A 4Kx8 Dynamic RAM with Self–Refresh", Reese et al., IEEE Journal of Solid–State Circuits, vol. SC–16, No. 5, Oct. 1981.

* cited by examiner

Primary Examiner—Hiep T. Nguyen
(74) Attorney, Agent, or Firm—Perman & Green, LLP

(57) ABSTRACT

A method for transmitting an address to a memory (3) for the purpose of reading and writing information. The memory (3) comprises memory cells for storing information as well as an address bus (19a) and a data bus (19b). Part of the address is transmitted via said address bus (19a) and part of the address is transmitted via said data bus (19b).

10 Claims, 4 Drawing Sheets

MEMORY INTERFACE USING ONLY ONE ADDRESS STROBE LINE

The present invention relates to a method for transmitting an address to a memory for the purpose of reading or writing data, the memory comprising memory cells for storing data, an address bus and a data bus. The invention also relates to a memory which comprises memory cells for storing data, an address bus and a data bus, as well as to a memory interface for the memory which memory comprises memory cells for storing data as well as an address bus and a data bus. Furthermore, the invention relates to a communication device comprising a memory which contains memory cells for storing data and an address bus and a data bus for addressing the memory cells.

Figure 1:
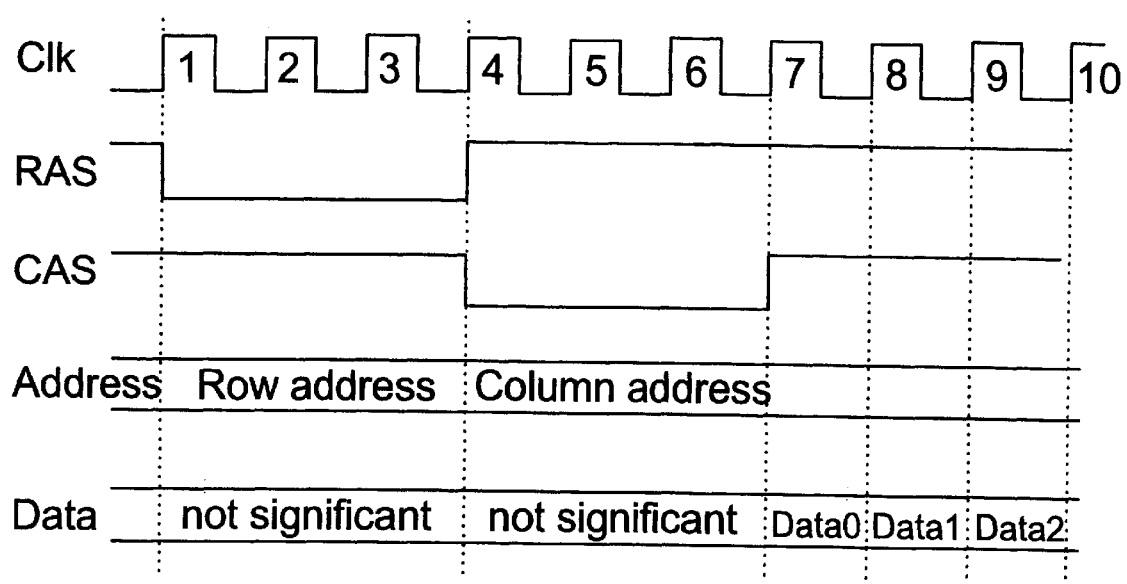

In synchronous DRAM memories (SDRAM) of prior art, the memory cells are organized in a matrix form, wherein the SDRAM memory is provided with a control logic, by means of which it is possible to address each memory cell of the matrix. The control logic comprises means for addressing a matrix row and means for addressing a matrix column. Writing and reading information from such SDRAM memories is conducted in blocks in such a way that at first, the initial address and the length of the block is transmitted to the SDRAM memory, after which the data is read or written synchronously under the control of a clock signal. The address is transmitted in two phases typically in such a way that in the first phase, the row address of the matrix corresponding to the target address, and in the second phase the column address of the matrix is written in the SDRAM memory. From these row and column addresses, the control logic of the SDRAM memory generates a signal to address the correct memory cell in the matrix. These row and column addresses are written along the same address lines, with the difference that when writing the row address, the SDRAM memory is notified by a separate row address strobe line that it is the row address in question, and correspondingly, when writing the column address in the SDRAM memory, a separate colum address strobe line indicates that the address in question is the column address. The appended FIG. 1 presents a timing plan indicating such an SDRAM memory of prior art when writing or reading data.

The synchronous DRAM memory differs from a conventional DRAM memory primarily in that from the synchronous DRAM memory, data is read and written in bursts. At the initiation stage, the synchronous DRAM memory is notified, by means of the above-presented address mechanisms, of the length of the burst to be read or written. First, when the data is to be read or written, the synchronous DRAM memory is notified of the initial address of the block to be read or written, after which an address counter is increased in the memory in order to address the next memory cell after reading or writing the preceding information. The length of the burst is preferably notified only once if the length of the burst changes. However, when using the conventional DRAM memory, each byte to be read or written should be externally provided with a separate memory address, i.e. with a separate row and column address for each memory cell to be read. In this way the speed of the synchronous DRAM memory is increased when compared with the conventional DRAM memory. This is useful especially if the data to be read or written is sequential by nature. However, in situations when data is read randomly from various locations, for example one byte at a time, the speed of the synchronous DRAM memory does not necessarily exceed the speed of the conventional DRAM memory.

The synchronous DRAM memory can be advantageously used as a data memory for a processor, as a display memory in video applications, and as a storage location for a program code of an application, especially in situations when an increase is desired in the execution rate. Read only memories (ROM) are typically slower than sychronic DRAM memories, wherein the program code of the application or part of it is loaded from the read only memory into the SDRAM memory before executing the application. In systems which use two or more processors, the same synchronous DRAM memory can be utilized for storing the program codes of these different processors during the execution. Since the same SDRAM memory is used for several functions, the speed of this SDRAM memory easily becomes a significant factor affecting the performance of the system. The speed of the processors and possible cache memories can be increased by increasing the clock frequency with new manufacturing processes, but the data rate of the external memory interface cannot be significantly increased in this manner. Thus, in some situations, the load on the memory bus can exceed 100%, wherein the performance of the entire system is affected by the slowness of the memory bus.

Processors use the SDRAM memory in electronic devices typically via cache memories. The cache memory of a processor is divided into blocks of fixed size. Thus, one block is read from the SDRAM memory into the cache memory or written from the cache memory into the SDRAM memory at a time. The processor has to, for example, retrieve information from the SDRAM memory. At first, the processor examines, whether the information is loaded in the cache memory e.g. due to a preceding reading operation. If the information is in the cache memory, it is available for the processor. In other cases, the data is retrieved from the SDRAM memory. The processor sets the initial address in which the data to be read is located in the SDRAM memory as well as the length of the block to be read, for example 16 bytes. After this, the block is read from the SDRAM memory into the cache memory, from which the processor can retrieve the read information. Writing takes place reversely with a corresponding principle. Also, when using the SDRAM memory as a display memory, data is typically read in blocks into the display driver. Data transmission can be implemented either via a processor or via a separate memory manager (DMA, Direct Memory Access Controller). In case the desired information is not found in the cache memory, the information has to be retrieved from the SDRAM memory into the cache memory. Thus, the processor has to wait during the entire transfer, wherein the performance of the processor falls practically into zero. Thus, the time consumed by the reading/writing operation between the cache memory and the SDRAM memory affects the performance of the processor.

A known solution for the aforementioned performance problem is to increase the width of the data bus for example from 16 bits to 32 bits, or to increase the clock frequency of the external memory bus. However, increasing the bus width requires a larger number of connecting pins outside the memory circuit, which increases the physical size of the circuit and the size of the semiconductor material used in the manufacture of the circuit, as well as the power consumption of the circuit. Increasing the clock frequency, in turn, increases the power consumption of the memory circuit correspondingly; for example by increasing the clock frequency by 30%, the power consumption in the memory circuit is increased by 30%.

One purpose of the present invention is to provide a faster data transmission method to and from a memory, a bus interface, and a memory. The invention is based on the idea that a data bus is also used as an address bus. The method according to the present invention is characterized in what will be presented in the characterizing part of the appended claim 1. The dynamic memory according to the present invention is characterized in what will be presented in the characterizing part of the appended claim 6. The memory interface according to the present invention is characterized in what will be presented in the characterizing part of the appended claim 10. Furthermore, the communication device according to the present invention is characterized in what will be presented in the characterizing part of the appended claim 5.

With the present invention, considerable advantages are achieved when compared with solutions of prior art. With the method according to the invention, the data reading and writing rate can be significantly increased when compared with solutions of prior art. Since the memory addressing according to the invention uses a data bus also as an address bus, separate sequences for addressing the rows and columns are not necessary, and neither are separate strobe lines for row and column addresses. Thus, the row and column addresses can be transferred substantially simultaneously into the memory circuit. Furthermore, a smaller number of interface lines is required when compared with solutions of prior art. The performance is enhanced without increasing power consumption, which is a significant advantage especially in portable electronic devices.

Figure 2:
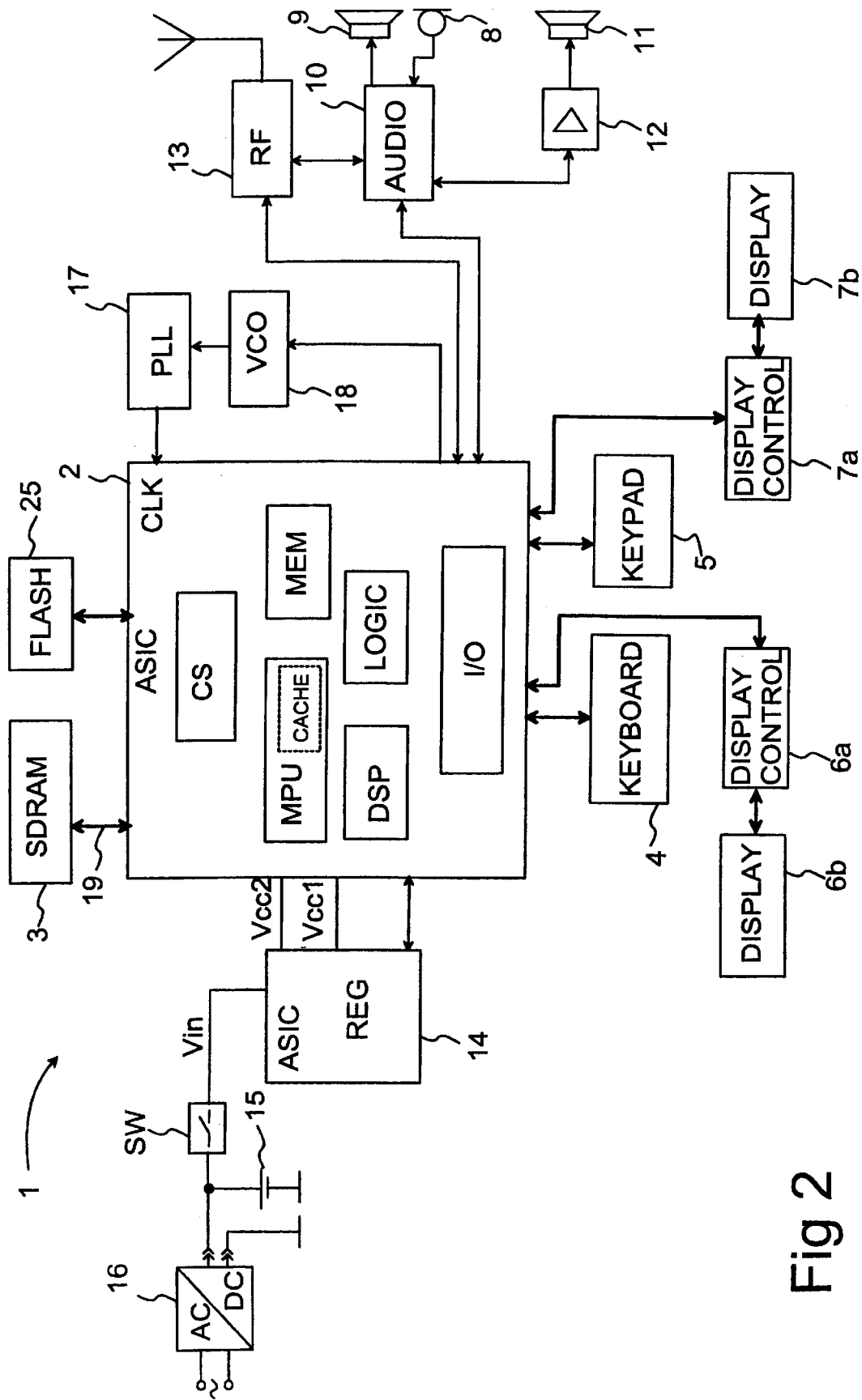
Figure 3A:
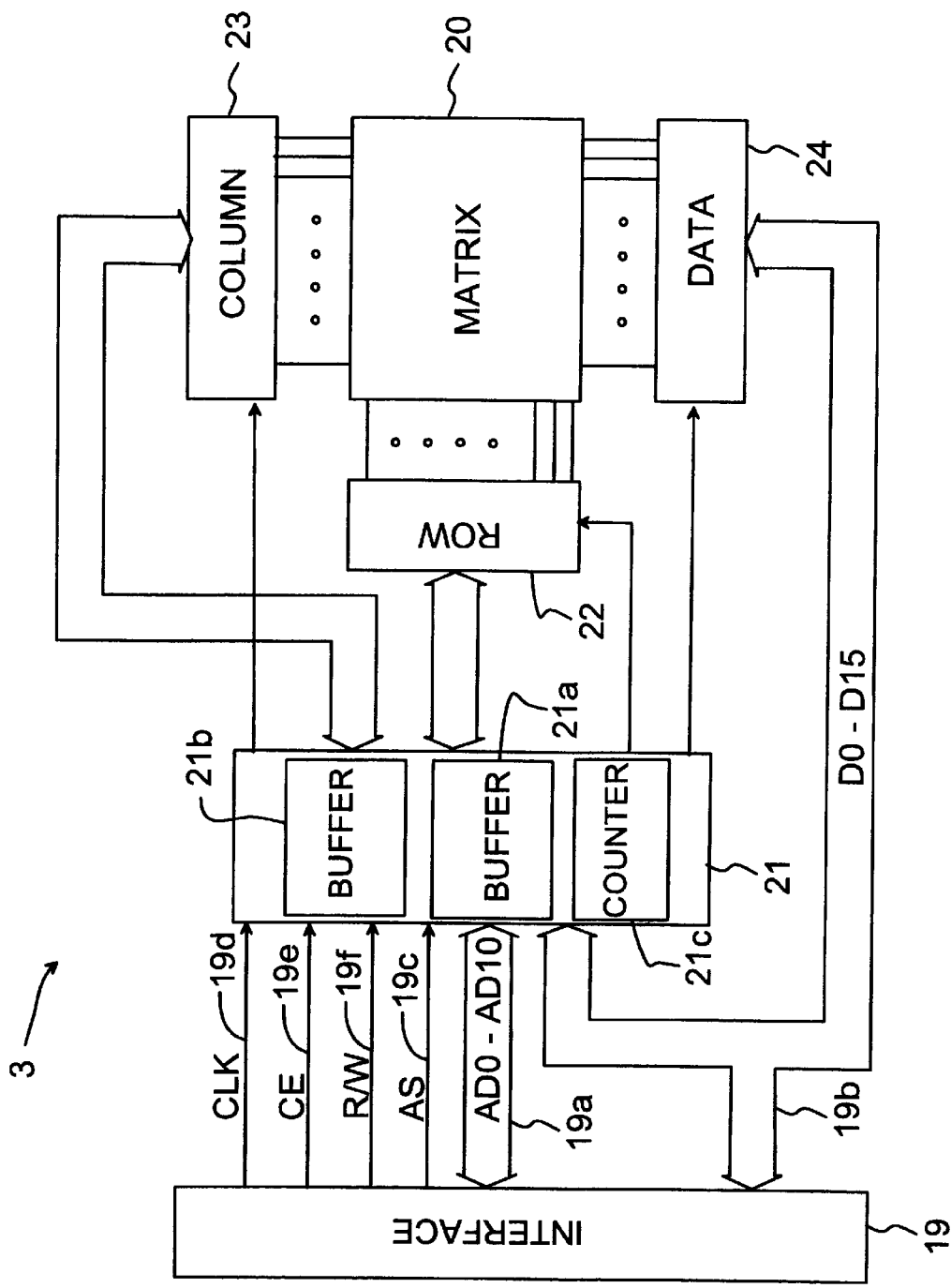
Figure 3B:
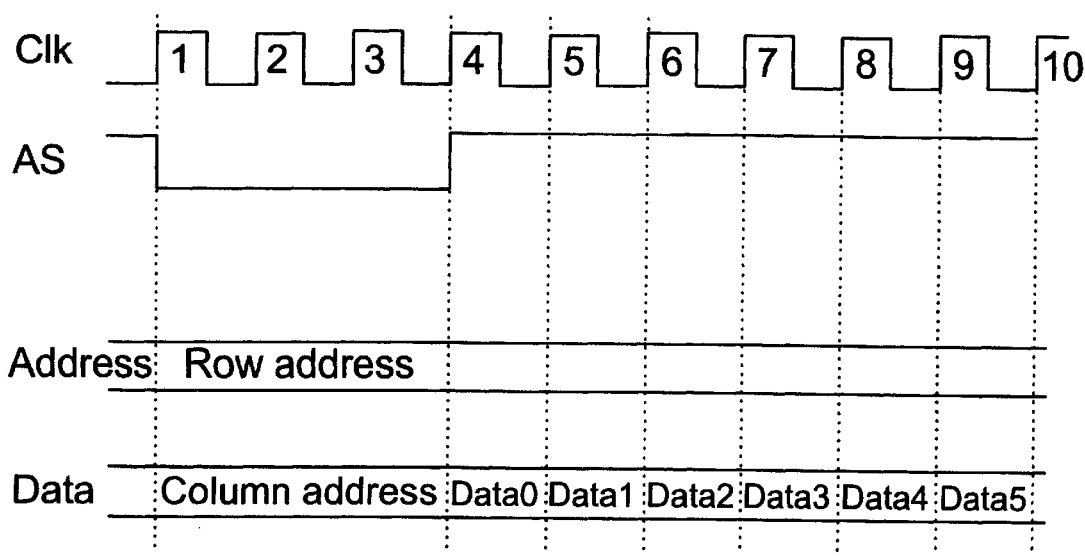

In the following, the present invention will be described in more detail with reference to the appended figures, in which FIG. 1 shows the reading and writing operations of an SDRAM memory of prior art in a timing diagram, FIG. 2 shows an electronic device in which the method and the SDRAM memory according to the invention can be applied, FIG. 3a shows an SDRAM memory according to an advantageous embodiment of the invention in a reduced block diagram, and FIG. 3b shows the reading and writing operations of the SDRAM memory according to FIG. 3a in a timing diagram.

FIG. 2 is a reduced block diagram showing an electronic device 1 in connection with which the invention can be advantageously applied. In this example, the electronic device 1 is a communication device comprising data processing functions and mobile station functions. A large part of the functions of the electronic device 1 is implemented in a first ASIC circuit 2. This first ASIC circuit 2 comprises for instance a first processor MPU (Micro Processing Unit) which is advantageously a universal so-called RISC processor, i.e. a reduced instruction set computer. Furthermore, the first ASIC circuit 2 advantageously comprises a second processor DSP, i.e. a digital signal processor, in which signal processing functions are typically implemented. The first ASIC circuit 2 also comprises memory means MEM which can be partly shared by the first processor MPU and the second processor DSP. Furthermore, the first ASIC circuit 2 comprises logic circuits LOGIC and interface logic I/O. The couplings between these different blocks of the first ASIC circuit 2 are not shown in more detail in FIG. 2, because they are prior art known as such by anyone skilled in the art. FIG. 2 ilustrates a cache memory of the first processor with a dashed line block CACHE. Furthermore, the electronic device 1 can comprise other external memory means, such as FLASH memory 25. The second processor DSP is not necessarily inside the first ASIC circuit 2, but can also be implemented as a separate unit.

The first ASIC circuit 2 is connected to a keyboard 4, which in this embodiment is a keyboard used primarily in connection with data processing functions, advantageously a so-called QWERTY keyboard. This first ASIC circuit 2 is also connected to a keypad 5, primarily used in mobile station functions. In this embodiment, the electronic device 1 also comprises two display devices 6b, 7b, which are controlled with display drivers 6a, 7a. The first display device 6b is primarily used in connection with data processing functions, and the second display device 7b is primarily used in connection with mobile station functions. It is obvious that said keyboard 4 and keypad 5 and the first display device 6b and the second display device 7b can be used in connection with both mobile station functions and data processing functions, if necessary. A microphone 8 and a receiver 9 are coupled via an audio block 10 to the first ASIC circuit 2. This audio block 10 contains a codec, by means of which, for instance during an audio call, a microphone signal is converted to a digital signal and the digital speech signal is converted to an analog signal to be transmitted to the receiver 9. The electronic device 1 advantageously also comprises a speaker 11, to which the audio signal is transmitted advantageously via an audio amplifier. 12. The speaker 11 is primarily used when the electronic device 1 is for example on a table in a position in which it is possible to use the data processing functions, or in a situation when a call is to be heard by several people nearby, or in a hands-free mode in a vehicle.

A phase locked loop (PLL) 17 is used to produce a clock signal for instance for the first ASIC circuit 2. The phase locked loop 17 is controlled with a voltage controlled oscillator (VCO) 18, whose frequency can be changed in order to alter the frequency of the phase locked loop PLL when necessary.

The electronic device 1 in FIG. 2 also comprises a high frequency section 13 (RF, Radio Frequency), by means of which calls are transmitted between the electronic device 1 and the mobile communication network (not shown) in a way known a such.

Furthermore, the electronic device 1 comprises a power supply circuit 14, which in this embodiment is also implemented as an ASIC circuit. This power supply circuit 14 comprises means for generating operating voltages $V_{CC1}$, $V_{CC2}$ from a supply voltage $V_{IN}$. The supply voltage $V_{IN}$ is advantageously generated by means of a battery 15, which is loaded with a loading device 16 when necessary.

In FIG. 2, the bus interface between a SDRAM memory 3 and the first ASIC circuit 2 is marked as a single bus 19, which is shown in more detail in FIG. 3a, which shows, in a reduced block diagram, also the SDRAM memory 3 according to a preferred embodiment of the invention. The SDRAM memory 3 is composed for instance of memory cells organized in matrix format, illustrated by block 20 in FIG. 3a, a control logic 21, a row selector 22, a column selector 23, and a data buffer 24. The control logic 21 advantageously comprises a row address buffer 21a, a column address buffer 21b, a counter 21c, and other control logics which is not shown in detail in the block diagram of the appended FIG. 3a.

Most of the address coding logic CS (Chip Select) of the memory means 3, MEM is implemented in the first ASIC circuit 2 of the electronic device. As is known as such, the memory space provided by the memory means 3, MEM can be divided into different memory areas, of which one memory area can be common to different processors MPU, DSP, one memory area may be allocated e.g. only for the first processor MPU, one memory area for the second processor DSP and, furthermore, one memory area for each display driver 6a, 7a. In view of understanding the present invention, it is not, however, significant how the memory space is implemented in practical applications. If a 32 bit address bus (AD0–AD31) is available, it is possible to implement a memory space of more than 4 gigabytes. However, in practical applications, such an extensive memory space is not necessary, but especially in portable electronic devices, the memory quantity reaches typically from a couple of megabytes to tens of megabytes. To address a particular memory location, the processor MPU, DSP sets the address of this memory location in its address lines. After that, the address coding logic CS produces control signals for the memory 3, MEM in which the desired memory location is situated, for example in the SDRAM memory 3. When producing control signals, it is common to use a few most significant bits of the memory bus. With three bits (e.g. AD29–AD31) it is possible to encode eight different memory areas, wherein for example one memory area corresponds to the inner memory of the first processor MPU, the second memory area to the inner memory area of the second processor DSP, the third memory area to the inner memory MEM of the first ASIC circuit, one memory area to the SDRAM memory 3, one memory area to the FLASH memory, etc. The remaining bits of the address bus are used to address the memory location in the memory area in question.

In the following, the function of the SDRAM memory 3 according to the preferred embodiment shown in FIG. 3 will be described. As an example, it is assumed that the SDRAM memory comprises 64 Mbits (Megabits) of memory organized in words with a width of 16 bits, i.e. approximately four million words. Thus, the memory matrix is most advantageously arranged in a matrix of 2048 rows and 2048 columns (2048×2048), in which each element contains 16 bits. Thus, 11 bits are required to address the rows, and 11 bits are required to address the columns as well. Such an SDRAM memory requires for instance 11 address lines, 16 data lines, one address strobe line 19c, and one clock line 19d. The data is written advantageously in the following way. In the SDRAM memory 3, the initial address of the desired writing point is set in the address bus 19a and data bus 19b. The address is established for example by setting the most significant part, for example bits b11–b21, of the initial address (marked b0–b21) of the writing point in the address bus 19a in such a way that b11 is set as the value for the least significant bit AD0 of the address bus, b12 is set as the value for the next least significant bit AD1, etc. The least significant part of the initial address of the writing point, in this case bits b0–b10, are set in the data bus 19b in such a way that b0 is set as the value for the least significant bit D0 of the data bus 19b, b1 is set as the value for the next least significant bit D1 of the data bus, etc. It is obvious that within the invention it is also possible to indicate the initial address in another way, for example so that the most significant section is set in the data bus 19b, and the least significant section is set in the address bus 19a. Next, the address strobe line 19c (AS, Address Strobe) is set into an active state, in this example in the logical 0 state. At this stage, the address information located in the address bus 19a and in the data bus 19b is transferred to the row address buffer 21a and column address buffer 21b, for example in such a way that the address infromation located in the address bus 19a is transferred to the row address buffer 21a, and correspondingly, the address information located in the data bus 19b is transferred to the column address buffer 21b. It is obvious that the address of the address bus 19a can be shifted into a column address, and correspondingly, the address on the data line 19b can be shifted into a row address. Furthermore, in this embodiment it is assumed that the blocks have a constant size, e.g. 16 bits, wherein it is not necessary to separately transmit data on the size of the block to the SDRAM memory. Within the scope of the invention, it is also possible to implement block sizes other than the one presented herein. However, the block size is preferably an involution of two (4, 8, 16, 32).

From the row address buffer 21a, the address information is transferred into a row selector 22, which is used to select a row of memory cells corresponding to the target area from the memory matrix 20. Accordingly, from the column address buffer 21b, the address is transferred to the column selector 23, which selects a corresponding column from the memory matrix 20. The four least significant bits of the column selector are produced from the outputs of the counter 21c. With the active value of the address strobe line 19c, this counter is set to zero, wherein the output of the counter has the value 0. At the next stage, the first information of the block to be stored in the SDRAM memory 3 is set in the data bus 19b. In this example, the width of the address bus 19b is 16 bits, i.e. 2 bytes, wherein 2 bytes of the block can be stored with the same writing operation.

At the next stage, the address strobe line 19c is set in a non-active state, in this example the logical 1 state. Typically, in SDRAM circuits of 100 MHz, the above-presented transfer of the memory address to the selectors 22, 23 lasts three clock sequences. Thus, the state of the address strobe line 19c is maintained active during the three clock sequences. The clock signal is transmitted to the control logic 21 via a clock line 19d (CLK). This clock line also processes a majority of the internal timings of the SDRAM memory 3. The control logic 21 produces control signals for the data buffer 24 to specify the data transfer direction in the data buffer 24 (read/write). When writing the information, the direction from the data bus 19b into the memory matrix 20 is set as direction data, wherein information is transferred into the memory matrix 20 for example on the rising and falling edge of the clock signal. In practice, the data buffer 24 is composed of two separate bus buffers, whose directions are opposed to each other, and both of the buffers are provided with a so-called three-state output. Such a three-state output can be set in a floating state when the output is not active. This enables using the same data bus 19b for both writing and reading, as is known as such.

With the clock signal, the counter 21c is also advantageously increased by one, and a new address is transmitted to the column selector 23. Now, the next data of the block to be transferred, in this case the third and fourth byte, are written in the data bus 19b, after which the data is stored in the memory matrix 20. The procedure is continued in the way presented above until the entire block has been transferred. In this example, the transfer of a block of 16 bytes requires 8 writing sequences, wherein the total length obtained is 11 clock sequences, as can be seen in the timing plan of FIG. 3b.

Reading of data from the SDRAM memory 3 primarily follows the principles presented above. The most substantial difference is that the state of a reading/writing line 19e is set into another state, in this example into the logical 1 state, which causes the data transfer direction to turn into an opposite direction in the data buffer 24 when compared with the situation of writing data. The initial address of the data to be read is set in the address bus 19a and in the data bus 19b as presented above. The address strobe line 19c is also set in an active state, until the address information has been transferred to the row selector 22 and the column selector 23, and the counter 21c is advantageously reset. Subsequently, the address strobe line 19c is set in a non-active state, after which the control logic 21 is used to control the data transfer from the memory matrix 20 to the output of the data buffer 24, wherein data can be read from the data bus 19b. The data is read for example on the falling edge of the clock impulse. Either on the falling edge or on the rising edge of the clock impulse, the counter 21c is also increased by one again, and the next data can be retrieved from the memory matrix 20. In this example, also the operation of reading the block requires a total of 11 clock sequences.

FIG. 1b shows a timing plan for a SDRAM memory of prior art functioning at a clock frequency of 100 MHz. Address transfer requires six clock sequences, because row and column addresses are transmitted via the same bus. With the solution according to the invention, the access speed of the SDRAM memory can be considerably increased. For example, when using a data bus of 16 bits, the transfer of a block of 16 bytes requires 14 clock sequences in the SDRAM memory of prior art, and as presented above, in the SDRAM memory 3 according to the invention, 11 clock sequences are sufficient for the transfer of a block of 16 bytes. In this case, the increase in the speed is approximately 30%. If a data bus of 32 bits (4 bytes) is used, in the SDRAM memory of prior art 10 clock sequences, and in the SDRAM memory 3 according to the invention 7 clock sequences are sufficient for the transfer of a block of 16 bytes. In this case, the increase in speed is approximately 43%, i.e. the speed is nearly doubled, wherein in a number of applications a considerable enhancement in performance is achieved.

Dynamic memories also require a so-called refresh logic which is used to maintain the information stored in the memory. The function of this refresh logic is known as such, and it is not significant in view of understanding the solution according to the present invention, and thus, for the sake of clarity, the refresh logic and its function will not be described in this specification.

Even though the invention was described above in connection with the SRDAM memory 3, it is also possible to apply the invention in connection with conventional DRAM memories, wherein the data bus can be used in the address transfer by following the above-presented principles. Besides the dynamic memory, the invention can also be used in such other memory circuits in which the memory addressing is based on the use of row and column addresses presented above in this specification. Memory circuits equipped with such a memory interface are implemented in Flash memories and even in mask programmable read only memories (ROM). The memory addressing according to the invention can also be applied in fast dynamic memories (DDR, Double Data Rate DRAM) which are under development.

In the following, the function of an electronic device 1 according to FIG. 2 will be briefly described in situations when the SDRAM memory 3 is addressed with different processors MPU, DSP and display drivers 6a, 7a. It is assumed that the SDRAM memory 3 is a memory circuit of 8 megabytes, placed in the memory space in an address area of 0x40000000–0x407fffff, in which the part 0x indicates a 16 base number, i.e. a hexadecimal number. In this memory space, a separate memory area of the SDRAM memory 3 is allocated for each processor MPU, DSP and display driver 6a, 7a, for example in the following way: for the first processor MPU the memory area 0x40000000–0x401fffff, for the second processor DSP the memory area 0x40200000–0x403fffff, for the first display driver 6a the memory area 0x40400000–0x405fffff, and for the second display driver 7a the memory area 0x40600000–0x407fffff. In these addresses, the value of the nine most significant bits AD23–AD31 is always the same: 0100 0000 0, which in the address coding logic CS has the effect that the selection line 19e of the SDRAM memory 3 is set in an active state, e.g. logical 0 state.

When the first processor MPU is reading data from the SDRAM memory 3, the first processor sets the address of the data to be retrived in the address bus. The address coding logic CS detects that the address is in the memory area allocated for the SDRAM memory 3, wherein the address coding logic CS conducts a conversion which effects address transmission according to a preferred embodiment of the invention to the SDRAM memory 3. In this example, the address coding logic CS sets the most significant bits b11–21 of the address indicated by the first processor MPU into the bits AD0–AD10 of the address bus, and the least significant bits b0–b10 into the bits D0–D10 of the data bus. Furthermore, the address coding logic CS sets the selection line 19e of the SDRAM memory 3 to an active state. In this example, the address coding logic CS also sets the address strobe line 19c in an active state for the duration of three clock sequences, wherein the address information has been transferred to the selectors 22, 23 in the SDRAM memory 3, and can be read. Synchronized by the clock signal, the reading is conducted into the cache memory CACHE of the first processor. The writing in the SDRAM memory 3 is also conducted primarily in a corresponding way. The first processor MPU writes the information in the cache memory CACHE and transmits the initial address of the storage location of the block in the SDRAM memory 3 to the address coding logic CS, which converts it to the address bus 19a and data bus 19b of the SDRAM memory 3.

The address coding logic CS sets the address strobe line 19c into an active state for a determined period of time, after which the first information (in this example two bytes) of the block to be stored is transferred from the cache memory CACHE to the data bus of the SDRAM memory 3, and the reading/writing line 19f is set in an active state, e.g. logical 0 state, for a determined period of time, wherein the data buffer 24 transfers the information to the memory matrix 20. The counter 21c of the SDRAM memory 3 is advantageously increased by one, and the next information is written in the above-described way. As for the second processor DSP, and the display drivers 6a, 7a, the data is read from and written to the SDRAM memory 3 in a corresponding way.

In electronic devices 1, which share a SDRAM memory 3, and possibly also other memory means MEM, the address coding logic CS is advantageously responsible for prioritizing simultaneous reading/writing operations among different processors MPU, DSP, display drivers 6a, 7a, or the like. Thus, the address coding logic CS sets for the means MPU, DSP, 7a, 7b that is to be arranged to wait, a waiting line (WAIT, not shown) or the like in an active state. When the waiting line is set in a non-active state, the means MPU, DSP, 7a, 7b or the like can start transmitting data to the allocated memory 3, MEM. The method according to the present invention shortens such waiting times considerably when compared with methods of prior art.

The present invention is not restricted solely to embodiments presented above, but it can be modified within the scope of the appended claims.

What is claimed is:

1. A method for transmitting an address to a memory (3) for the purpose of reading and writing information, which memory (3) comprises memory cells for storing information and an address bus (19*a*) and a data bus (19*b*), characterized in that part of the address is transmitted via said address bus (19*a*) and part of the address is transmitted via said data bus (19*b*), wherein one address strobe line is used to effectuate a transfer of address information from the address bus and the data bus to the memory, and a row address and a column address are transmitted to memory substantially simultaneously and the row address and the column address are read from the address bus and the data bus into a row selector and a column selector substantially simultaneously.

2. The method according to claim 1, in which method the memory cells are arranged into a memory cell matrix (20), wherein the memory cells are addressed with a row address and a column address, characterized in that the row address is transmitted via the address bus (19*a*), and the column address is transmitted via the data bus (19*b*), or that the column address is transmitted via the address bus (19*a*) and the row address is transmitted via the data bus (19*b*).

3. The method according to claim 1, characterized in that the memory (3) used is a dynamic memory.

4. The method of claim 1 wherein a single address strobe line is used to access the row and column address simultaneously.

5. A communication device comprising a memory (3) which comprises memory cells for storing information and an address bus (19*a*) and a data bus (19*b*), characterized in that the communication device (1) also comprises means (19*c*, 21) for transmitting an address to the memory (3) partly via said address bus (19*c*) and partly via said data bus (19*b*), wherein one address strobe line is used to effectuate a transfer of address information from the address bus and the data bus to the memory, and wherein the means for transmitting the address to the memory comprises means (21) for transmitting a row address and a column address substantially simultaneously to the memory and the row address and the column address are read from the address bus and the data bus into a row selector and a column selector substantially simultaneously.

6. A memory (3) which comprises memory cells for storing information as well as an address bus (19*a*) and a data bus (19*b*), characterized in that the memory (3) comprises means (19*c*, 21) for transmitting an address partly via said address bus (19*c*) and partly via said data bus (19*b*), wherein one address strobe line is used to effectuate a transfer of address information from the address bus and the data bus to the memory, and wherein the means for transmitting the address comprises means (21) for transmitting a row address and a column address to memory substantially simultaneously and the row address and the column address are read from the address bus and the data bus into a row selector and a column selector substantially simultaneously.

7. The memory (3) according to claim 6, which memory (3) comprises a memory cell matrix (20) and means for addressing the rows of the memory cell matrix with a row address and columns with a column address, characterized in that the means (19*c*, 21) for transmitting the address comprise:

means (21) for transmitting the row address via the address bus (19*a*) and means for transmitting the column address via the data bus (19*b*), or means (21) for transmitting the column address via the address bus (19*c*) and means for transmitting the row address via the data bus (19*b*).

8. The memory (3) according to claim 6, characterized in that it is a dynamic memory.

9. The memory (3) according to claim 8, characterized in that it is a synchronous dynamic memory (SDRAM).

10. A memory interface for a memory (3), which memory (3) comprises memory cells for storing information as well as an address bus (19*a*) and a data bus (19*b*), characterized in that the memory interface (19) comprises means (19*c*, 21) for transmitting an address to the memory (3) partly via said address bus (19*c*) and partly via said data bus (19*b*), wherein one address strobe line is used to effectuate a transfer of address information from the address bus and the data bus to the memory, and wherein the means for transmitting the address comprises means (21) for transmitting a row address and a column address to memory substantially simultaneously and the row address and the column address are read from the address bus and the data bus into a row selector and a column selector substantially simultaneously.

* * * * *